Figure 1:
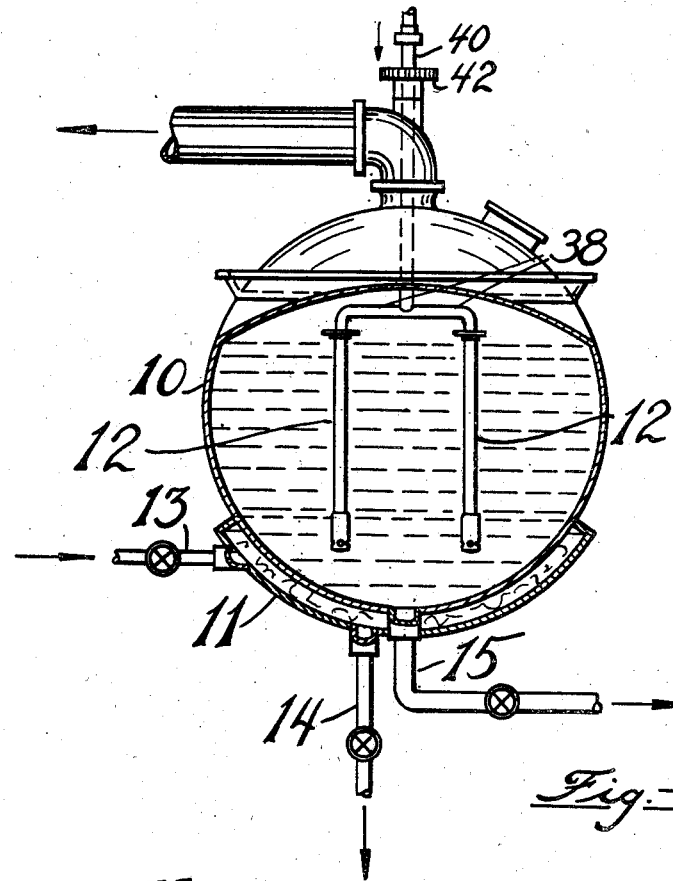

June 29, 1943.   J. F. SILHAVY   2,322,749
HEATING AND TREATING WORT
Filed Sept. 6, 1940

John F. Silhavy
INVENTOR

Patented June 29, 1943

2,322,749

UNITED STATES PATENT OFFICE 2,322,749

HEATING AND TREATING WORT

John F. Silhavy, Chicago, Ill.

Application September 6, 1940, Serial No. 355,542

14 Claims. (Cl. 99—52)

This invention relates to heating and boiling wort and more particularly relates to heating and boiling wort by using submerged combustion and passing hot products of combustion through the wort or passing gases through the wort while heating it.

One of the very important steps in the manufacture of beer is the boiling of wort with hops. Sweet wort (solution of sugars, dextrins, proteins, etc.) is drawn from a mash tub and run into the brew kettle where the wort is boiled and hops are added. The kettle is a large vessel, usually of copper construction, and usually equipped with a steam coil. Low pressure steam, usually at about 25 lb. pressure, is employed to supply the heat necessary for boiling the wort in the vessel.

After sufficient sweet wort has been run in to submerge the coil, steam is admitted into the coil while the wort is being run into the kettle. While the wort is being run into the kettle, heating is continued and the wort is brought to a boil. Hops are added in several portions at definite times or all at once according to the wishes of the brewmaster. Boiling of the wort is continued from about one and one-half to two and one-half hours. During this boiling period many important changes occur within the wort which have a direct bearing on the quality of the beer produced by fermenting the hopped wort. They include (1) precipitation of some proteins, (2) solution of some hop constituents, (3) general sterilization of the batch, (4) slight caramelization of sugars, etc.

The extent to which some of these changes occur is dependent to a considerable degree on the manner in which heat is applied. One of the most important of these changes and the one which is most favorably affected by my method of heating is the precipitation of undesirable proteins. For example, a vigorous ebullition with its resultant circulation of the wort is most effective for the thorough precipitation of undesirable proteins; this precipitation of proteins being compulsory, otherwise if retained in the wort solution their presence will cause undesirable turbidity in the finished beer.

The proteins present in the wort vary considerably in molecular size. At the small end there are those proteins of small molecular size that remain easily in solution and apparently are not coagulable by heat, then the intermediate molecular size or less-soluble proteins, and going up the scale there are those larger molecular size proteins which appear in colloidal solution and suspension. This last group gives the wort its hazy appearance and it is these and other heat-coagulable proteins which must be precipitated during the boiling process and removed by subsequent filtration.

Throughout the main body of the wort while in the quiescent state there is a substantially uniform distribution of solids or substances (sugars, proteins, dextrins, hop resins, etc.) in solution. But from the viewpoint of physical chemistry it is known that at any surface layer of the wort, as for example, at the top surface there exists a different condition due to the unequal attraction and motion of molecules occurring at the surface. The same condition obtains at any contact surfaces formed within the body of the wort as, for example, when contact surfaces are created by the formation of steam bubbles during boiling.

Since these substances in solution all lower the surface tension of the liquid, they occur in a more concentrated form at the contact surfaces of wort/air and wort/steam-bubbles than in the main body of the wort. This phenomenon is expressed in Gibbs' law, which states that "a substance which lowers the surface tension of a liquid will be more concentrated in the surface layer than in the interior of the phase." The proteins present in wort are known to be strongly surface-active which is another way of stating that they are in very concentrated form at these contact surfaces.

Under existing boiling procedures a precipitation of proteins occurrs to any appreciable extent only after ebullition starts and the bubbles of steam rise through the wort thereby forming the necessary contact surfaces throughout the body of the wort. Here at these surfaces the surface-active proteins become more and more concentrated until the molecules, due to their closer proximity to each other and more frequent collisions, begin to agglomerate and form larger aggregates. After agglomeration has proceeded sufficiently the precipitation of the larger aggregates of proteins takes place. This explains why ebullition along with its resultant circulation is so necessary in the boiling kettle for precipitation of these proteins. And consequently, it becomes at once apparent that my new method of heating wort which increases the amount of contact surfaces within the wort along with more vigorous ebullition and its resultant increased circulation produces new results and better worts which have not been obtained by previous methods.

I have invented a new method and apparatus for boiling wort which includes the use of submerged burners and submerged combustion whereby the products of combustion come in direct contact with the wort. According to my invention there is a better rate of heat transfer to the wort; there is a large increase in the amount of bubble-wort surfaces produced and these are produced as soon as heating starts and below boiling temperatures; and there is produced a more positive circulation within the wort. With my invention, caramelization of substances in the wort is effected sooner and the precipitation of undesirable proteins is more complete and therefore the boiling period is shortened. In addition, it is possible to control to a certain degree the rH (oxidation-reduction potential) of the boiling wort by the use of my new method.

Another advantage of using my new method lies in the exceedingly high temperature employed as will be presently described and which affects caramelization most favorably and improves palatability of the final beer product. For example, when steam at 25 lb. guage pressure is used as a heating medium in the brew kettle, the temperature of the steam is only about 265 degrees F. According to my invention I employ submerged combustion as a heating means for the brew kettle, the temperature of which ranges from 2000 to 3000 degrees F. so that a high heating temperature, far beyond that of steam at ordinary temperatures is obtained; and by this new heating method I obtain new and distinct advantages, some of which have been pointed out above.

Figure 2:
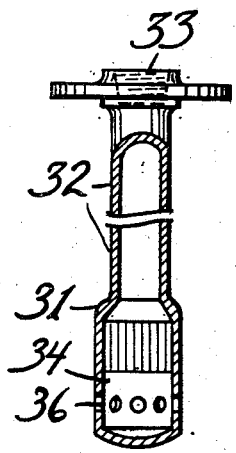

In the drawing:

Fig. 1 represents an elevation of a brew kettle including one form of my invention; and Fig. 2 represents an enlarged vertical section of one form of submerged burner which may be used in the brew kettle.

Referring now to the drawing, the arrangement shown therein will be briefly described. The reference character 10 designates a brew kettle jacketed as at 11 and having submerged burners 12 of a known type for supplying heat and gases by submerged combustion. Steam jacket 11 is provided with inlet pipe 13 and outlet pipe 14. Drain pipe 15 is provided for withdrawing the boiled and treated wort from the kettle 10. Referring now to the burners 12, gas and air are mixed in proper proportions and the mixture is burned by means of burners below the surface of the wort and in the body of the wort in the brew kettle. In Fig. 2 I have shown one form of a burner 31 which can be used, but other submerged burners supplying heat and gases by submerged combustion with high temperatures can be used.

The burner has a tubular portion 32 with a threaded end 33, a combustion chamber 34 and outlet ports 36 for the combustion gases adjacent to the combustion chamber. Gaseous fuels are preferably used and such fuels may be mixed with air in stoichiometric proportions in an industrial carburetor or the like and then forced under pressure through the tubular portion 32 and through the burner, being burned in the combustion chamber 34. While either a reducing or oxidizing flame may be used by varying the gas and air ratios of the mixture, I prefer to use a slightly reducing flame for reasons which will be given hereinafter.

Preferably purified gases such as hydrogen, acetylene, methane, propane, natural or artificial gases or the like are used. The mixture of fuel and air is burned beneath the surface of the wort in the brew kettle. The burner may be positioned at any suitable height in the brew kettle but the burner should be placed sufficiently deep in the wort being heated so that the combustion gases will give up their heat to the wort as they bubble through it, and so that the gases of combustion in escaping will not carry off valuable heat. Apparatus may be included for raising or lowering the burners to any desired depth. However, the ideal position of the burner is such that the temperature of the outgoing gases and the wort are about the same.

One or more of these burners can be installed in each kettle, depending on the size of the burner and the size of the kettle. The burners are small and can be readily removed for cleaning between brews if necessary. On account of the very hot combustion gases coming in direct contact with the wort and since there is no separating wall between the gases of combustion and the liquid to be heated, the coefficient of heat transfer is extremely high.

In the drawing I have shown an installation of submerged burners in brew kettle 10 to obtain heating and treating wort by submerged combustion with a very high temperature heating medium. In this particular construction the burners 12 are attached to a tubular rotatable arm 38. For small kettles the burner or burners need not be revolved. Or for large kettles the burner or burners need not be revolved. However, for large kettles it is preferred to revolve the burners as this assists in increasing circulation of the wort during heating.

The rotatable arm 38 comprises a tubular member 40 for introducing combustible fluid mixtures to the burners. The rotatable arm 38 extends into the brew kettle and is suitably supported and is suitably rotated by means of gear 42. By revolving the burners, the whole mass is kept in motion to bring the hot combustion gases from the burners into unheated portions of the liquid in the brew kettle.

One method of using my invention will now be described where submerged burners are used in conjunction with steam jacket 11. As soon as sufficient sweet wort has been run into the kettle 10 to submerge the burners 12 and the steam jacket 11, steam is admitted into the jacket and the burners are lighted. The latter step immediately introduces myriads of small bubbles of combustion gases which pass upward through the wort, and it is at these bubble surfaces where the proteins begin to concentrate long before actual boiling starts and accumulation and concentration of the proteins at the bubble surfaces is initiated.

The velocity of the flame and combustion gases as they emerge from the burners immediately sets up a positive circulation within the wort as soon as the burners are lighted. In addition, the local overheating of the wort as it comes in momentary contact with the extremely hot flame and gases of combustion, both at the burner and during the ascent of the latter in form of bubbles throughout the mass, will cause vigorous ebullition at these contact points. This vigorous ebullition further increases the circulation within the entire mass of wort.

During the operation of the submerged burners and before boiling actually starts, the bubbles of combustion gases rise through the body of the wort and expel any air or oxygen that may be present in the wort. After having passed through the liquid the combustion gases displace the layer of air which is immediately above the wort in the air space in the kettle and on the surface of the wort. In this way a protective layer of combustion gases is formed on top of the wort, which gas prevents oxidation of the reducing substances present in the wort. This deleterious oxidation of reducing substances is naturally accelerated as the temperature of the wort rises during heating; and this means of removing oxygen from the immediate contact with the wort and preventing its oxidation is a very important step for reasons described later.

During filling of the kettle, heating by submerged combustion and steam continues. After the kettle is filled, heating is continued and the wort is boiled and hops are added at desired intervals or all at one time. During all this heating, the bubbles of combustion gases have been rising through the wort, forming additional new contact surfaces as above described. When boiling starts, steam bubbles are formed which rise through the wort and form contact surfaces in addition to the combustion gas bubbles so that additional surfaces are provided for acculation and concentration of proteins.

Since it is known by Gibbs' law that the surface-active proteins accumulate at these bubble-word surfaces, increase in size, and then finally precipitate there, the advantages of using my new method of heating wort are at once apparent. In the old method the only bubble-wort surfaces present in the wort are those caused by steam bubbles rising in the mass after boiling starts. In my new method there are in addition myriads of bubble-wort surfaces caused by the gases of combustion as they whirl through the mass and rise as bubbles to the surface as soon as heating starts.

This tremendous addition of myriads of exceedingly hot bubbles of gases of combustion causes a more vigorous and quicker ebullition, which condition produces a further increase of steam bubbles throughout the mass. This tremendous increase of bubble-wort surfaces present within the wort greatly aids the precipitation of the proteins. Therefore, since protein precipitation is favored by a large amount of surfaces and heat and greater circulation, it can readily be seen that my new heating method presents ideal conditions for wort boiling. During heating with submerged combustion, I also obtain destruction of enzymes, sterilization of the wort, concentration of the wort, and solution of some hop constituents.

Another advantage in the use of my new method of boiling wort lies in the fact that due to the great increase of surfaces within the wort and the resultant increased circulation within the latter, protein precipitation is more rapid and more complete. This more complete precipitation of the proteins within the kettle has the very important effect of reducing the amount of protein precipitation formed when the wort is cooled, consequently reducing the amount of proteins which otherwise would surround yeast cells and reduce the fermentation rate.

Recent work in the brewing art has shown that it is beneficial to maintain conditions which prevent destruction or removal of reducing substances or agents normally present in the wort. When the brewing operations are so carried out that the final beer product contains a substantial amount of these reducing substances, a better beer will be produced from the standpoint of stability and clarity. When using my invention with a reducing flame I prevent any substantial oxidation of the reducing substances present in the wort and thereby produce an improved wort which when fermented will produce a more stable and better beer.

Another advantage in the use of my new heating method lies in the fact that a saving of hops is effected. This is due to the fact that since the proteins are more completely precipitated by the increase of heat and contact surfaces, rather than depending to a large extent on the use of hop tannins. The hops can be added later in the boiling thereby imparting a better flavor to the wort.

In case it is desired to use submerged combustion heating only for a limited time during the heating period, the steam is continuously supplied and the submerged burners are turned on when desired and left in operation for the desired length of time and then turned off.

Another way of practising my invention is to first use the submerged burners alone for heating the wort and concentrating the proteins for a desired period of time and then aiding this heating and completing the precipitation of proteins by introducing steam into the jacket or coil. Or the burners may be turned off when the steam is turned on.

If desired, steam may be omitted and all the heating done with submerged burners and submerged combustion.

As another modification, steam may be used first alone for raising the temperature to the desired degree and then heating the wort by submerged combustion in addition to the steam heating or after the steam is turned off.

While the above disclosure relates primarily to kettles or containers operating under atmospheric pressure, my invention also includes the use of submerged burners in kettles operating under super- or sub-atmospheric pressures.

While I prefer to use submerged burners and the resultant combustion gases, it is within the contemplation of my invention to use hot combustion gases from other sources such as waste stack gases or hot combustion gases produced in other ways.

This case is filed as a continuation in part of my application S. N. 104,187, filed October 6, 1936, for Methods of and apparatus for making beer.

What I claim is:

1. A method of cooking a malted liquid to produce wort which when fermented will have increased palatability, high stability, and better head retention, which comprises boiling such malted liquid in a tank and treating such liquid to increase caramelization by directly introducing into the body of such liquid hot gases heated to a temperature in excess of the boiling point of the liquid.

2. A method of treating a hopped, malted liquid, which comprises bringing such liquid in direct contact with hot gases of combustion having a temperature in excess of the boiling point of the liquid to produce local overheating of such liquid, and to impart characteristics to the hopped, malted liquid so that when it is fermented the malt product will have increased palatability, will have a higher stability, and will have a better head retention.

3. In a method of cooking a malted liquid to produce wort which when fermented will be substantially free from precipitable proteins, the steps which comprises boiling the wort with heat supplied by submerged combustion taking place within the malted liquid to cause a more complete precipitation of undesirable proteins in the wort.

4. A method of heating wort to produce a vigorous ebullition thereof which comprises burning a mixture of a combustible gas with air beneath the surface of the wort, passing the gases of combustion through the wort and causing them to give up heat to the wort whereby at the same time the gases of combustion bubble through the wort to form contact surfaces to increase the precipitation of proteins.

5. A method of adding heat to malted liquid to cause more rapid and complete precipitation of proteins which comprises bubbling gases of combustion of a temperature higher than the boiling point of the malted liquid through the malted liquid.

6. A method of causing circulation in a malted liquid which comprises burning a mixture of a combustible gas and air beneath the surface of the malted liquid and directly contacting the malted liquid with the gases of combustion, the gases of combustion causing the circulation as soon as heating starts and before boiling starts.

7. A method of heating wort which comprises introducing hot combustion gases into the lower portion of the body of the wort so that the combustion gases bubble through the wort to cause large contact bubble-surfaces between the wort and the combustion gases at which surfaces the proteins are concentrated and precipitated to effect more rapid and complete precipitation of undesirable proteins, the combustion gases in passing through the wort causing increased circulation which assists in the precipitation of proteins.

8. A method of heating wort which comprises burning a mixture of a combustible gas and air beneath the surface of the wort and in the lower portion of the body of the wort to produce hot combustion gases within the body of the wort, contacting the hot combustion gases with the wort to cause large bubble contact surfaces between the wort and combustion gases at which surfaces the proteins are concentrated and precipitated to effect more rapid and complete precipitation of proteins, the combustion gases passing through the wort causing increased circulation which assists in the precipitation of the proteins.

9. A method of cooking a hopped, malted liquid which comprises heating the liquid indirectly with a heating medium and directly introducing hot gases into the liquid during at least a portion of the time of the indirect heating with the heating medium, the hot gases being at a temperature above the boiling point of the liquid.

10. A method of cooking wort for a period of time which comprises heating the wort for at least a part of the period with steam by indirect contact and heating the wort for at least a part of the period by directly contacting it with hot gases injected into the wort, the hot gases being at a temperature above the boiling point of the wort.

11. A method of cooking wort for a period of time which comprises heating the wort for at least a part of the period with steam by indirect contact and heating the wort for at least a part of the period by directly contacting it with hot combustion gases produced by burning a mixture of fuel and air beneath the surface of the wort so that the combustion gases bubble through the wort and form bubble contact surfaces for assisting in the precipitation of proteins.

12. A method of causing circulation in a wort which comprises introducing a non-oxidizing gas heated to a temperature above the boiling point of the wort into the body of the wort while heating the wort so that contact bubble surfaces are formed and circulation started before boiling starts.

13. A method of cooking a malted liquid to produce wort which when fermented will have increased palatability, high stability, and better head retention, which comprises boiling such malted liquid in a tank and treating such liquid to increase caramelization by directly introducing into such liquid hot gases heated to a temperature above the boiling point of the liquid and adding hops to the wort during the cooking.

14. A method according to claim 4 wherein the combustion gases are produced by burning a mixture of fuel and air in a confined space moving thru the liquid to effect increased circulation of the liquid during heating.

JOHN F. SILHAVY.